(No Model.)
W. G. SIMPSON.
TIRE TIGHTENER.
No. 565,366. Patented Aug. 4, 1896.
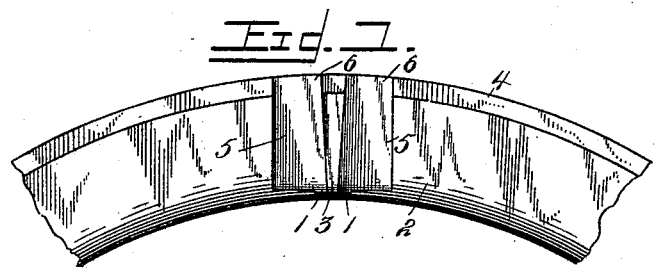
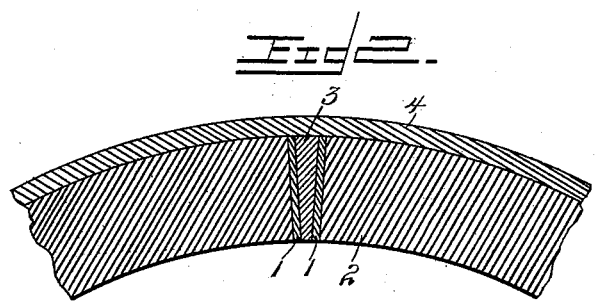
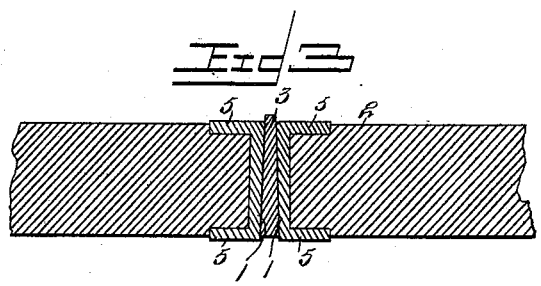
 
Inventor
William G. Simpson
Witnesses
By his Attorneys,

UNITED STATES PATENT OFFICE.

WILLIAM G. SIMPSON, OF DELTA, COLORADO.

TIRE-TIGHTENER.

SPECIFICATION forming part of Letters Patent No. 565,366, dated August 4, 1896.

Application filed May 11, 1896. Serial No. 591,108. (No model.)

*To all whom it may concern:*

Be it known that I, WILLIAM G. SIMPSON, a citizen of the United States, residing at Delta, in the county of Delta and State of Colorado, have invented a new and useful Tire-Tightener, of which the following is a specification.

The invention relates to improvements in tire-tighteners.

The object of the present invention is to improve the construction of tire-tighteners and to provide a simple, inexpensive, and efficient device capable of ready adjustment and adapted to expand the felly of a wheel to tighten the tire or to permit the felly to expand to prevent the wheel from becoming dished.

The invention consists in the construction and novel combination and arrangement of parts hereinafter fully described, illustrated in the accompanying drawings, and pointed out in the claims hereto appended.

In the drawings, Figure 1 is an elevation of a portion of a wheel provided with a tire-tightener constructed in accordance with this invention. Fig. 2 is a vertical sectional view taken longitudinally of the wheel. Fig. 3 is a horizontal sectional view. Fig. 4 is a detail perspective view of the wedge. Fig. 5 is a similar view of one of the keepers of the fellies.

Like numerals of reference designate corresponding parts in all the figures of the drawings.

1 1 designate a pair of caps fitting over the adjacent ends of fellies 2 of a wheel and adapted to be engaged by a wedge 3, whereby the fellies are expanded to tighten the tire 4 of the wheel. Each cap consists of a plate arranged on the end of a felly, side flanges 5, embracing the side faces of the felly, and end flanges 6, forming extensions of the side flanges and engaging the side edges of the tire.

The wedge 3 is provided with a double taper, being gradually tapered from one side edge to the other, and from the outer to the inner end.

The taper, from one side edge to the other of the wedge, operates to expand the fellies as it is driven between them, and the other taper of the edge locks it against any inward or downward movement and prevents it from falling from between the fellies.

The wedge is held against lateral movement by having its thinner side edge offset or bent against the caps of one of the fellies. Any number of wedges may be employed, and when two or more are employed they are reversely arranged. In dry weather the fellies contract and the tire becomes loose, and it is necessary to expand the fellies by means of a wedge or wedges, and in damp or wet weather the fellies expand, and in order to prevent the wheel from becoming dished one or more wedges may be removed as required.

It will be seen that the tire-tightener is exceedingly simple and inexpensive in construction, that it is strong and durable, and that it will enable a wheel to be properly adjusted without employing a blacksmith or wheelwright.

Changes in the form, proportion, and minor details of construction may be resorted to without departing from the principle or sacrificing any of the advantages of this invention.

What I claim is—

1. In a device of the class described, the combination with a tire and fellies, of a wedge interposed between the ends of the fellies and tapering from its outer to its inner end and from one side edge to the other, substantially as and for the purpose set forth.

2. In a device of the class described, the combination with a tire and fellies, of caps arranged on the ends of the fellies and provided with flanges embracing the side faces of the fellies and the side edges of the tire, and a wedge interposed between the caps and tapering from one side edge to the other and from its outer to its inner end, and adapted to have its thinner end bent or offset against the caps, substantially as described.

In testimony that I claim the foregoing as my own I have hereto affixed my signature in the presence of two witnesses.

W. G. SIMPSON.

Witnesses:
  F. I. GATES,
  W. ROY SIMPSON.